US009902885B2

(12) United States Patent
Schaekens

(10) Patent No.: US 9,902,885 B2
(45) Date of Patent: Feb. 27, 2018

(54) NON-REACTIVE HOT MELT ADHESIVE, ITS MANUFACTURE AND ITS USE IN SEALING PACKAGES

(71) Applicant: PURAC BIOCHEM BV, Gorinchem (NL)

(72) Inventor: Chris François Hubert Schaekens, Gorinchem (NL)

(73) Assignee: PURAC BIOCHEM B.V., Gorinchem (NL)

( * ) Notice: Subject to any disclaimer, the term of this patent is extended or adjusted under 35 U.S.C. 154(b) by 0 days.

(21) Appl. No.: 15/311,811

(22) PCT Filed: May 28, 2015

(86) PCT No.: PCT/EP2015/061836
§ 371 (c)(1),
(2) Date: Nov. 16, 2016

(87) PCT Pub. No.: WO2015/150580
PCT Pub. Date: Oct. 8, 2015

(65) Prior Publication Data
US 2017/0081572 A1    Mar. 23, 2017

(30) Foreign Application Priority Data

Jun. 3, 2014   (EP) .................................. 14170916
Dec. 16, 2014  (EP) .................................. 14198122

(51) Int. Cl.
| C08K 5/29 | (2006.01) |
| C09J 167/04 | (2006.01) |
| C09J 11/06 | (2006.01) |
| C09J 7/02 | (2006.01) |
| B65B 51/02 | (2006.01) |
| B65B 51/10 | (2006.01) |
| C09J 5/00 | (2006.01) |

(52) U.S. Cl.
CPC ............. *C09J 167/04* (2013.01); *B65B 51/02* (2013.01); *B65B 51/10* (2013.01); *C09J 5/00* (2013.01); *C09J 7/0203* (2013.01); *C09J 11/06* (2013.01); *C08K 5/29* (2013.01); *C09J 2201/61* (2013.01); *C09J 2467/00* (2013.01)

(58) Field of Classification Search
CPC ........ C09J 167/04; C09J 5/00; C09J 2201/61; C09J 2467/00; B65B 51/02; B65B 51/10; C08K 5/29

USPC ........................................................ 524/195
See application file for complete search history.

(56) References Cited

U.S. PATENT DOCUMENTS

| 4,057,537 | A | * | 11/1977 | Sinclair | C08G 63/08 162/146 |
| 4,263,221 | A | | 4/1981 | Schnabel et al. | |
| 5,312,850 | A | * | 5/1994 | Iovine | C08L 93/04 524/270 |
| 6,221,212 | B1 | * | 4/2001 | Sjostrom | D21H 27/38 162/125 |
| 2002/0128344 | A1 | * | 9/2002 | Fujihira | B29B 13/08 522/162 |
| 2010/0249331 | A1 | * | 9/2010 | Babcock | C08G 63/90 525/274 |
| 2011/0092620 | A1 | | 4/2011 | Scheffner et al. | |

FOREIGN PATENT DOCUMENTS

| EP | 0 741 177 A2 | 11/1996 |
| EP | 2 292 712 A1 | 3/2011 |
| WO | 94/10251 A1 | 5/1994 |

OTHER PUBLICATIONS

Viljanmaa et al., International Journal of Adhesion & Adhesives, 22, 219-226, 2002.*
Viljanmaa et al., "Lactic acid based polymers as hot melt adhesives for packaging applications," International Journal of Adhesion and Adhesives, 2002, vol. 22, pp. 219-226.
Jul. 30, 2015 International Search Report issued in International Patent Application No. PCT/EP2015/061836.
Jul. 30, 2015 Written Opinion of the International Searching Authority issued in International Patent Application No. PCT/EP2015/061836.

* cited by examiner

*Primary Examiner* — Hui Chin
(74) *Attorney, Agent, or Firm* — Oliff PLC

(57) ABSTRACT

A non-reactive hot melt adhesive containing a copolymer being substantially composed of a reaction product of lactide (L) and caprolactone (C) in a molar ratio (L/C) of at least 1.5. The adhesive further includes a carbodiimide compound. The presence of a small but effective amount of carbodiimide causes a stabilizing effect on the sealing properties of the adhesive, especially if it is exposed to higher temperatures. A method manufactures the adhesive and a method seals a package with the adhesive.

17 Claims, 1 Drawing Sheet

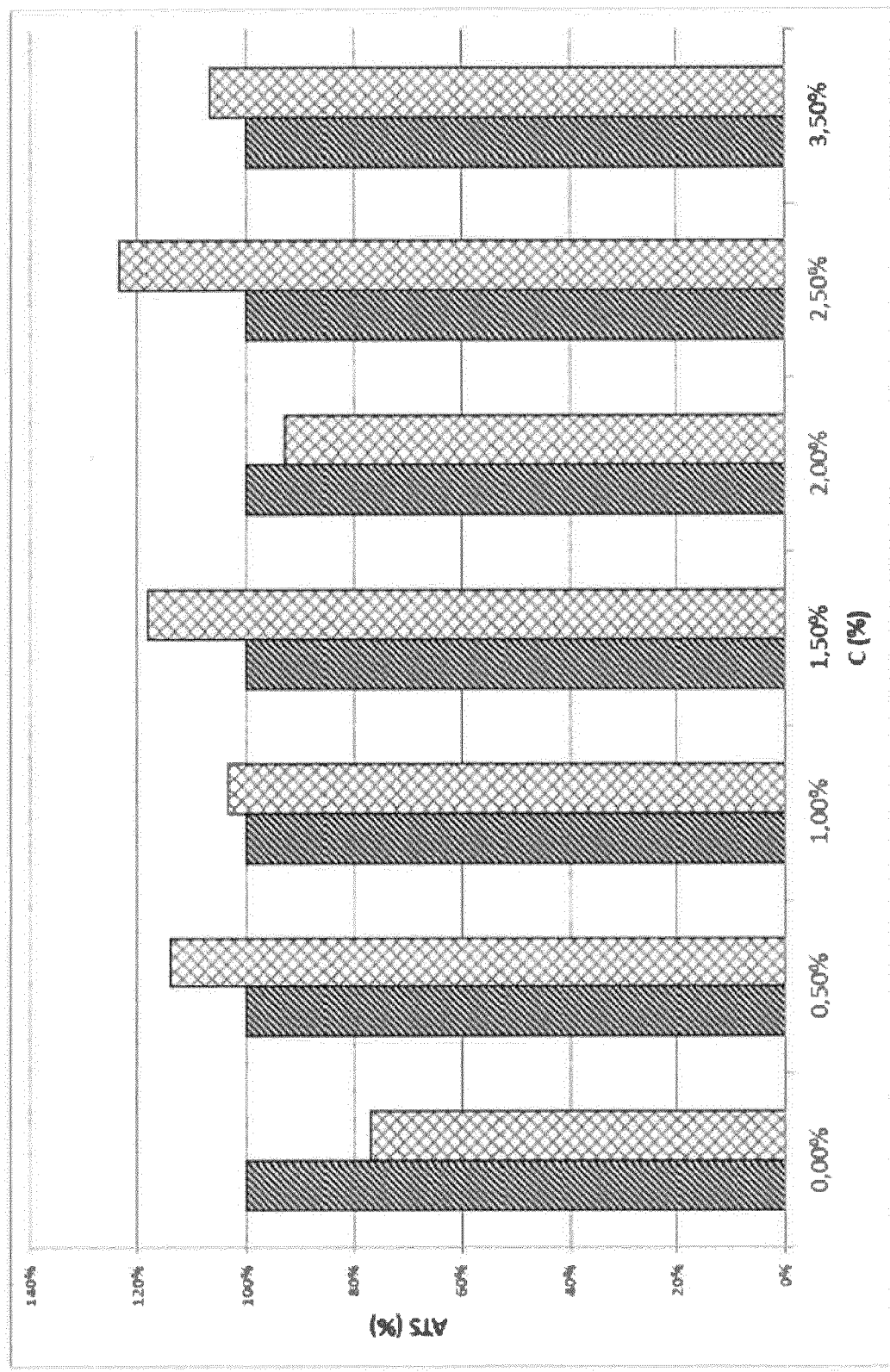

NON-REACTIVE HOT MELT ADHESIVE, ITS MANUFACTURE AND ITS USE IN SEALING PACKAGES

FIELD OF THE INVENTION

The invention relates to a non-reactive hot melt adhesive containing a copolymer being substantially composed of a reaction product of lactide (L) and caprolactone (C) in a molar ratio (L/C) of at least 1.5. The invention pertains also to a method for the manufacture of such non-reactive hot melt adhesive. The invention finally concerns a method for sealing a package by means of such non-reactive hot melt adhesive. As used herein, "hot melt adhesive" refers to a thermoplastic polymer composition that is heated to obtain a liquid of flowable viscosity, and after application to a substrate, cooled to obtain a solid. After the hot melt adhesive solidifies upon cooling to a temperature below its melt temperature or below its solidification transition temperature, an adhesive bond is formed between the substrate and the adhesive material. As essentially no chemical bonds are formed between the adhesive and the substrate upon which the adhesive is applied, the hot melt adhesive is generally referred to as a non-reactive hot melt adhesive.

Hot melt adhesives are often used to bond two substrates together so as to maintain the two substrates in a fixed relation to each other. Hot melt adhesives are also used in articles that include a nonwoven layer to bond the nonwoven layer and a polymer film layer together. Hot melt adhesives are further used to adhere packaging constructions e.g. bag, box, carton, case and tray together to construct the package, close the package or both.

BACKGROUND OF THE INVENTION

A non-reactive hot melt adhesive of the type mentioned in the opening paragraph is known as such. For example, the publication "Lactic acid based polymers as hot melt adhesives for packaging applications", published in Int. J. of Adhesion & Adhesives 22 (2002), pages 219-226 describes such adhesive. More particularly, this document pertains to an investigation of copolymers based on poly(L-lactide) and poly(ε-caprolactone) with a molar ratio (L/C) of 81/19. Copolymers of this type are of interest because of their biodegradability. In compost environments it is apposite that the major part of the packaging material can be degraded within a certain period of time. It is therefore important that possible remaining adhesive material can also be degraded within the same period of time.

The known non-reactive hot melt adhesive shows an important disadvantage. It has appeared that its long term thermal stability is not optimal. Thus, the adhesive properties appear to degrade in an unacceptable manner if the adhesive is exposed for a long period of time to a higher temperature. Unwanted effects like loss of adhesion strength are observed, especially if the adhesive is stored for several days or more at temperatures of approximately 175° C. or more. After such exposure period, it cannot be used properly for sealing packages, especially if the material of the package is composed of cardboard, wood and other types of packaging materials.

SUMMARY OF THE INVENTION

The present invention has as its object to mitigate or at least reduce the technical problem mentioned in the previous paragraph. More particularly, the present invention aims at providing a non-reactive hot melt adhesive, which can be stored for a long time at elevated temperatures and still maintain its adhesion properties. Such an improved adhesive of the type defined in the opening paragraph should therefore provide good adhesion properties, which are moreover stable over time. The invention further aims at providing a simple and reliable method for the manufacture of such an improved non-reactive hot melt adhesive. A further objective of the present invention aims at providing a method for sealing a package made of a package material, especially cardboard material, in which the invented adhesive can be advantageously used.

These and possible further objects of the invention are achieved with a non-reactive hot melt adhesive containing a copolymer being substantially composed of a reaction product of lactide (L) and caprolactone (C) in a molar ratio (L/C) of at least 1.5, which adhesive is characterized in that the adhesive further comprises a carbodiimide compound. Examples of suitable compounds are the aliphatic carbodiimides dicyclohexyl carbodiimide and isopropyl carbodiimide. Especially suitable carbodiimides are aromatic carbodiimides, of which the compound bis-3-isocyanoato-4-methylphenyl carbodiimide is a good example. Other examples or suitable carbodiimide compounds are disclosed in U.S. Pat. No. 4,263,221.

The inventor has found unexpectedly that including a small but effective amount of a carbodiimide compound in the non-reactive hot melt adhesive leads to a surprising increase in the stability of the adhesion properties of said adhesive. Experimental evidence has shown that only a small amount, in the order of a few % or less by weight (compared to the total weight of the copolymer and carbodiimide in the adhesive), of a carbodiimide compound is already enough to show the stabilizing effect. Thus an amount of 0.05-2.5% by weight is already sufficient to provide the adhesive with its desired stable adhesion properties. An amount of carbodiimide lower than 0.05% by weight generally does not lead to an optimal increase of the adhesion properties. An amount greater than 2.5% by weight results in an undesired increase in the brittleness of the adhesive, which brittleness appears to increase with an increasing amount of the carbodiimide. The observed brittleness is generally not desired. A good compromise of the optimal adhesion properties of the invented hot melt adhesive is obtained where that the amount of carbodiimide lies in the range of 0.1-2.0% by weight, preferably in the range between 0.2 and 1.5% by weight. The carbodiimide may be applied as a single composition, although, depending on the required properties of the adhesive, mixtures of different types of carbodiimides may be applied as well. Good results have been obtained with carbodiimides of the type BioAdimide®, like BioAdimide® 500XT and especially BioAdimide® 100.

Without being bound to theory, the inventors believe that the presence of a small but effective amount of carbodiimide results in a decrease of acid promoted degradation reactions in the adhesive. Such reactions may lead to degradation of the copolymer and also to a decrease of the desired adhesion properties. The copolymer present in the adhesive according to the present invention is substantially composed of a reaction product of lactide (L) and caprolactone (C) in a molar ratio (L/C) of at least 1.5. It is noted that adhesives having a lower lactide content in the copolymer generally show a drop of the desired adhesion properties, and especially of those properties which are essential for the use of these adhesives in the sealing of packaging materials.

It is observed that the copolymer of the invented adhesive should be composed substantially (i.e. at least of 80% by weight of the copolymer) of a reaction product of lactide and caprolactone. Preferably the amount of reaction product of lactide and caprolactone in the copolymer is at least 90% by weight, and even more preferably the copolymer consists of only a reaction product of lactide and caprolactone i.e. without the inclusion of other monomers. In this respect, it is noted that, in addition to lactide and caprolactone, relatively small amounts of other monomer units may also be present in the copolymer, like glycolide and lactones other than caprolactone. Inclusion of other monomer units in the copolymer may be effective in order to improve certain desired properties of the adhesive.

Both lactide and glycolide are cyclic diesters of lactic acid and glycolic acid, respectively. During manufacture of the copolymer comprised in the invented adhesive, these components become incorporated in the copolymer as two neighboring lactic acid and glycolic acid units, respectively. Caprolactone (officially ε-caprolactone) is a cyclic ester molecule with a 7-membered ring. Manufacture of the copolymers is preferably performed by (ring-opening) polymerization of the cyclic esters and diesters, although, in the course of this invention, (condensation) polymerization of lactic acid (instead of lactide) and glycolic acid (instead of glycolide) is possible as well.

An interesting embodiment of the adhesive according to the present invention is characterized in that the mean molecular weight (Mn) of the copolymer ranges between 10000 g/mole and 50000 g/mol. Adhesives having a mean molecular weight less than 10000 g/mole tend to have a cohesion which may become too low for application as a hot melt adhesive at room temperature. Non-reactive hot melt adhesives having a mean molecular weight exceeding 50000 g/mole suffer from the disadvantage that their viscosity may become too high for practical use in sealing applications; viscosity lowering compounds need to be added to such an adhesive in order to make it suitable for practical use. Adhesives containing copolymers having a mean molecular weight (Mn) ranging between 20000 g/mole and 40000 g/mole are preferred, as they show an optimal balance between both negative properties mentioned before. Said mean molecular weights have been determined by means of gel permeation techniques.

Another advantageous embodiment of the invented hot melt adhesive has the feature that the adhesive further comprises a tackifier in an amount of up to 80% by weight, based on the total weight of the adhesive. The presence of such tackifier, for example present as a resin or analogous material, may provide additional adhesive strength to the hot melt adhesive. Examples of tackifiers may include: natural and modified rosin (e.g., gum rosin, wood rosin, tall-oil rosin, distilled rosin, hydrogenated rosin, dimerized rosin and polymerized rosin); glycerol and pentaerythritol esters of natural and modified rosins (e.g., glycerol ester of pale wood rosin, glycerol ester of hydrogenated rosin, glycerol ester of polymerized rosin, pentaerythritol ester of pale wood rosin, pentaerythritol ester of hydrogenated rosin, pentaerythritol ester of tall oil rosin and the phenolic modified pentaerythritol ester of rosin); polyterpene resins and hydrogenated polyterpene resins, copolymers and terpolymers of natural terpenes (e.g. styrene-terpene, alpha-methyl styrene-terpene and vinyl toluene-terpene); aliphatic and cycloaliphatic petroleum hydrocarbon resins (e.g., branched and unbranched $C_5$ resins, $C_9$ resins, and $C_{10}$ resins); aromatic petroleum hydrocarbons and the hydrogenated derivatives thereof; aliphatic/aromatic petroleum derived hydrocarbons and the hydrogenated derivatives thereof; and, combinations thereof. The amount of the tackifier preferably ranges between 50% and 70% by weight, based on the total amount of the adhesive.

Also advantageous is a non-reactive hot melt adhesive which, according to the present invention, has the feature that the adhesive further comprises a plasticizer in an amount of up to 40% by weight, based on the total weight of the adhesive. The presence of such plasticizer, preferably in an amount between 5 and 30% by weight, has the advantage that it adjusts the viscosity of the adhesive. Said plasticizer may be present as a wax (solid at room temperature) or as an oil (liquid at room temperature), depending on the type of application. Waxes are often used in adhesives for packaging applications (e.g. a packaging construction, to assemble the construction, close the construction or both), whereas oils are frequently applied in adhesives suitable for non-woven applications, in particular disposable articles including, e.g., medical drapes, medical gowns, sheets, feminine hygiene articles, diapers, adult incontinence articles, absorbent pads for animal use (e.g., pet pads) or human use (e.g., bodies and corpses); in pressure sensitive adhesives (PSA used in adhesive films, assemblies, tapes and labels); and, on a variety of substrates including, e.g., porous substrates (e.g., nonwoven webs and perforated films), films such as polymer films (e.g. polyethylene, polypropylene, polyvinylidene chloride, ethylene vinyl acetate, and polyester films). Typical examples of such plasticizers include, for waxes: paraffin waxes; microcrystalline waxes; Fischer-Tropsch synthetic waxes; polyethylene waxes; oxyalkylene polymer waxes (such as CARBOWAX™ Polyethylene Glycol (PEG) 600) and, vegetable derived wax defined herein as a wax derived from renewable natural resource, such as from a plant source such as soybean, cottonseed, corn, sunflower, canola and palm. Typical examples of such plasticizers include, for oil: plasticizing oils (e.g., mineral oil and naphthenic oil); olefin oligomers, and low molecular weight polymers; cycloparaffin oils; vegetable oils; such as castor oil; hydrogenated vegetable oils, like Cenwax™ ME; animal oil; and, derivatives of such oils. Examples of useful olefin oligomers include propylene, polybutene, and hydrogenated polyisoprene. Suitable animal oils include glycerol esters of the fatty acids and polymerization products thereof. It is preferred that both a plasticizer and a tackifier are present in the adhesive composition defined by the present invention. It is however noted that, in case that the amount of the tackifier exceeds 40% by weight of the total adhesive, plasticizers are not needed at all.

The composition of the invented non-reactive hot melt adhesive may optionally include further additives, such as antioxidants or other stabilizers, and optionally less than about 1 wt. % stabilizer or other additive. Addition of the compound Irgafos 126 has shown to be very effective in preventing undesired discoloration (from white to yellow) of the adhesive according to the invention.

Applicant has further found that the presently invented non-reactive hot melt adhesive can also be used with great advantage as a so-called 'single component adhesive'. This is to be understood as meaning that the adhesive properties of such adhesive are excellent, even in the absence of further main additives, like plasticizers (such as waxes or oils) or tackifiers. Application of the invented adhesive as a single component adhesive is of great interest because of its potential as a 'green' adhesive, as under these conditions the invented adhesive is substantially free of oil-derived ingredients. Such adhesives therefore do not suffer from the disadvantage of migration of mineral oil hydrocarbons.

These adhesives moreover are degradable to a high extent (more than 90% by weight over a period of half a year under standard conditions). Surprisingly, the described 'single component adhesive' can be heated efficiently up to its common operation temperature of approximately 160-170° C. and/or maintained at this temperature level by means of microwave radiation.

The invention also relates to a method for the manufacture of a non-reactive hot melt adhesive containing a copolymer being substantially composed of a reaction product of lactide (L) and caprolactone (C) in a molar ratio (L/C) of at least 1.5. Said invented method is characterized by the steps of: a) polymerizing a mixture comprising lactide and caprolactone in a molar ratio of at least 1.5 in the presence of a polymerization catalyst, and b) adding an amount of carbodiimide to the resulting copolymer of lactide and caprolactone in liquid phase, after completion of the reaction. The lactide and caprolactone are mixed in a molar ratio L/C of at least 1.5 to optimize the adhesive properties of the manufactured hot melt adhesive. As mentioned before, the co-polymer may also contain other molecules, such as glycolide or other lactones. Completion of the reaction is reached when more than 90% of the lactide, caprolactone and possible additional reactive monomers are polymerized into a copolymer. The progress of the reaction is monitored by means of liquid FT-IR measurements.

Polymerization of the monomers to a copolymer of desired composition is catalyzed by means of a catalyst, which is well-known for this purpose, preferably the widely used Sn-octoate. However, other catalysts may be used as well, especially metal catalysts, such as, for example, Zr-coordination compounds. For certain special applications in which metal species should be avoided, non-metal catalysts may be used as well. During polymerization, the cyclic monomers undergo ring-opening and the resulting linear structures are included into linear polymer chains. In the case of the cyclic monomer caprolactone, said resulting linear structure comprises a single monomer. In the case of the cyclic dimer lactide, the resulting linear structure comprises a dimer of two lactoyl monomers. It is stressed that, instead of the cyclic dimer lactide, the monomer lactic acid may also be used in the manufacture of the hot melt adhesive according to the present invention. However, the use of lactide is preferred in the production of the copolymer as its handling in the polymerization process is simpler than the handling of lactic acid.

Regarding the use of lactide, it is noted that this cyclic dimer molecule can exist in three different geometric structures, which have a diastereomeric relationship. These different structures can be distinguished as R,R-lactide (or D-lactide), S,S-lactide (or L-lactide) and R,S-lactide (or meso-lactide). Mixtures of equal amounts of D- and L-lactide are often referred to as racemic lactide or rac-lactide. Within the scope of the present invention, both the three pure lactides (being composed of only one diastereomer) as well as mixtures of two or more of the pure lactides can be used.

The method according to the present invention is preferably performed at a temperature of 160-200° C. At temperatures below 160° C., the reaction rate may be considered too low for industrial application. At temperatures above 200° C., there is a certain risk on degradation of the formed polymer. A polymerization temperature which forms an optimal balance between both negative features is found in the range between 170-190° C.

Also interesting is an embodiment of the invented method in which an amount of a mono-alcohol is added to the mixture. Such mono-alcohol can work as an initiator molecule in the polymerization reaction. The use of such initiator allows monitoring and control of the mean molecular weight (Mn) of the formed copolymer. For this purpose, mono-alcohols of a linear type, such as alkanols, have been proven to be very suitable, especially if their carbon-backbone length is shorter than 10 carbon atoms. Linear alcohols like n-pentanol, n-hexanol or n-heptanol are preferred.

Another interesting embodiment of the method according to the invention is characterized in that an amount of a di-alcohol is added to the mixture. Di-alcohols, such as butanediol, propanediol and hexanediol, as initiators are preferred over mono-alcohols as the former initiators allow growth of linear (co)polymer chains in two directions. This may lead to co-polymers having a lower polydispersity index (PDI). In this respect, the compound neopentyl glycol has proven to have advantageous initiator properties.

A further embodiment of interest for the invented method has as a feature that an amount of a catalyst deactivating agent is added to the mixture after completion of the reaction. Such agent is used to stop all catalytic activity in the copolymer system, including degradation activities. The type of deactivating agent is of course dependent on the type of catalyst used. In the case where Sn-octoate is used, it has been found that phosphor compounds are very suitable catalyst deactivators.

Also of interest in the method according to the invention, is an embodiment which is characterized in that a tackifier is added to the mixture in an amount of up to 80% by weight as determined on the total weight of the adhesive. The addition of such a tackifier, preferably in an amount ranging between 50% and 70% by weight, and present for instance as a resin or analogous material, may provide additional adhesive strength to the hot melt adhesive. Examples of such materials include hydrocarbons distilled from petroleum distillates, rosins and/or rosin esters, and terpenes derived, for example, from wood or citrus and other materials as described hereinbefore.

Also of interest is the method according to the invention, which is characterized in that a plasticizer is added to the mixture in an amount of up to 40% by weight as determined on the total weight of the adhesive. The addition of such a plasticizer, preferably in an amount between 5 and 30% by weight, has the advantage that it adjusts the viscosity of the adhesive. Said plasticizer may be present as a wax (solid at room temperature) or as an oil (liquid at room temperature), depending on the type of application. Waxes are often used in adhesives for packaging applications, whereas oils are frequently applied in adhesives suitable for non-woven applications and pressure sensitive adhesives (PSA, used in tape and labels), and other applications as described in the foregoing paragraphs. Typical examples of such plasticizers include mineral oil, polybutene, paraffin oils, ester oils, and the like as described in the foregoing. It is preferred that both a plasticizer and a tackifier are added to the adhesive composition defined by the present invention.

The invention relates also to a method for sealing a package made of a package material whereby an amount of a non-reactive hot melt adhesive in liquid form is applied to a first surface of the package material, after which this surface and another surface of package material are contacted. According to the invention, a non-reactive hot melt adhesive is used as defined above. In principle, different types of package material may be used. It has however been shown that our invention works with great effect when said package material is cardboard material. The method is especially useful for sealing packages in which the package material (such as cardboard) is coated with a layer of polyolefin, preferably polyethylene. It was shown that with the presently invented hot melt adhesive, high adhesion strengths could be realized on substrates which were coated on the surface with polyolefins, like polyethylene. Detachment of such coated substrates after being mutually glued with the hot melt adhesive resulted in material failure of the substrates or substrate coatings rather than cleavage along the interface between the polyolefin coating and the hot melt adhesive.

It is further observed that the non-reactive hot melt adhesive according to the present invention can be used in other applications, like in a pressure sensitive adhesive (PSA), and in non-woven (hygiene absorbent products, such as baby diapers, adult incontinent products, feminine hygiene products) and other applications as described in the foregoing paragraphs. More generally, typical markets for this type of hot melt adhesives are packaging, non-wovens, tapes and labels. The adhesives of this invention may also be useful in book binding, foam bonding, heat sealing applications, carpet sealing, bag end sealing, bonding filter media, insulation bonding, durable goods manufacturing (e.g., shoes and other athletic gear), wood working, construction, automotive applications, appliance applications and assembly applications (e.g., filter media, insulation, and bonding).

BRIEF DESCRIPTION OF THE DRAWINGS

The invention will be explained in more details by means of several experiments and the drawing, in which FIG. 1 shows a graph in which the absolute tensile strength (ATS) of a number of non-reactive hot melt adhesives containing various concentrations (c, in % by weight) of a carbodiimide are depicted.

DESCRIPTION OF PREFERRED EMBODIMENTS

Manufacture of Caprolactone/Lactide Random Polymer.

A non-reactive hot melt adhesive was prepared as follows. In a reactor equipped with a stirrer, a thermometer, a gas inlet and a condenser, 300 parts by weight of caprolactone (Brand Perstorp), 700 parts by weight of L-lactide (Puralact® B3), and 6.99 parts by weight of neopentylglycol (NPG) as initiator were charged. The temperature was raised to 150° C. under atmospheric pressure in a nitrogen atmosphere in order to melt the lactide. The temperature was subsequently raised to 180° C. after which 100 ppm Sn-octoate as polymerization catalyst was added to the reaction mixture. The mixture was allowed to react for approximately 6 hours until the reaction was completed. The ring-opening reaction was performed so that a copolymer was obtained having an average molecular weight (Mn) of approximately 30000 g/mole, as measured by absolute gel permeation chromatography techniques. As all components were initially mixed and reacted, a random polyester polymer was formed.

The reaction was completed by adding a small amount of a catalyst deactivating agent (here 150 ppm ADK STAB AX-71), and stirring the solution for appr. 20 minutes. After completion of the reaction, an amount of carbodiimide (here BioAdimide® 100 of the firm Rhein Chemie) was added to the formed polymer in liquid phase. The amounts varied from 0-3.5% by weight. In some experiments, waxes and/or tackifiers were added (both 25% by weight, as calculated on the total amount of the adhesive).

Samples of the so-obtained non-reactive hot melt adhesives with variable amounts of carbodiimide as well as a comparative sample without carbodiimide were kept for 48 hours at 175° C. With these samples, lap shear tests were executed, using the following conditions.

Substrates of 100 mm×25 mm were covered with a layer of a sample adhesive at 160-170° C. Subsequently, two of such substrates were adhered such that 25 mm×25 mm overlap areas were formed. The lap shear was tested quadrapole using a universal testing machine (Instron 3366). The maximum load was recorded, and the mean was taken.

Results of these tests are shown in FIG. 1. In this FIGURE, absolute tensile strengths (ATS) are shown as a function of the amount of added carbodiimide (concentration c in % by weight). The left columns indicate the ATS of the samples per concentration carbodiimide directly after the adding of the BioAdimide). The ATS of these columns were normalized to 100%. The right columns indicate the change in ATS after having stored these samples at a temperature of 175° C. for 48 hours.

From the graph, it is concluded that the sample without the added carbodiimide (furthest left in graph) shows a significant decrease in ATS after having kept these samples at a temperature of 175° C. for 48 hours. Prolonged heating showed an even larger decrease of the ATS (data not shown). The samples which included carbodiimide however showed no decrease in ATS after these samples were kept a temperature of 175° C. for 48 hours. This decrease is even absent in the sample which includes only 0.5% by weight of the carbodiimide. Prolonged heating of these carbodiimide containing samples showed that the ATS remained stable at appr. 100% (data not shown). The samples containing appr. 2.50% by weight of carbodiimide showed brittleness of the formed adhesive layer after having kept these samples at a temperature of 175° C. for 48 hours. This effect was even more pronounced in the samples which contained 3.5% by weight of the carbodiimide.

A person skilled in the art will realize that the present invention is by no means limited to the preferred embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to an advantage.

The invention claimed is:

1. A non-reactive hot melt adhesive containing a copolymer being substantially composed of a reaction product of lactide (L) and caprolactone (C) in a molar ratio (L/C) of at least 1.5, wherein the adhesive further comprises a carbodiimide compound, and the amount of carbodiimide ranges between 0.05 and 2.5% by weight as determined on the amounts of carbodiimide and the copolymer.

2. The non-reactive hot melt adhesive according to claim 1, wherein the mean molecular weight Mn of the copolymer ranges between 10000 g/mole and 50000 g/mole.

3. The non-reactive hot melt adhesive according to claim 1, wherein the adhesive further comprises a tackifier in an amount of up to 80% by weight, based on the total weight of the adhesive.

4. The non-reactive hot melt adhesive according to claim 1, wherein the adhesive further comprises a plasticizer in an amount of up to 40% by weight, based on the total weight of the adhesive.

5. The non-reactive hot melt adhesive according to claim 1, wherein the adhesive further comprises a stabilizer.

6. A method for the manufacture of a non-reactive hot melt adhesive containing a copolymer being substantially composed of a reaction product of lactide (L) and caprolactone (C) in a molar ratio (L/C) of at least 1.5, the method having the following steps:
   polymerizing a mixture comprising lactide and caprolactone in a molar ratio of at least 1.5 in the presence of a polymerization catalyst,
   adding an amount of carbodiimide to the resulting copolymer of lactide and caprolactone in liquid phase, after completion of the reaction,
   wherein the amount of carbodiimide ranges between 0.05 and 2.5% by weight as determined on the amounts of carbodiimide and the copolymer.

7. The method according to claim 6, wherein the polymerization is performed at a temperature of 160-200° C.

8. The method according to claim 6, wherein an amount of a mono-alcohol is added to the mixture.

9. The method according to claim 6, wherein an amount of a di-alcohol is added to the mixture.

10. The method according to claim 6, wherein an amount of a catalyst deactivating agent is added to the mixture after completion of the reaction.

11. The method according to claim 6, wherein a tackifier is added to the mixture in an amount of up to 80% by weight as determined on the total weight of the adhesive.

12. The method according to claim 6, wherein a plasticizer is added to the mixture in an amount of up to 40% by weight as determined on the total weight of the adhesive.

13. A method for sealing a package made of a package material whereby an amount of a non-reactive hot melt adhesive in liquid form is applied to a first surface of the package material, after which this surface and another surface of package material are contacted, wherein the non-reactive hot melt adhesive according to claim 1 is used.

14. The method for sealing a package according to claim 13, wherein the package material is composed of cardboard material.

15. The method for sealing a package according to claim 13, wherein the surface of package material is coated with a layer of polyolefin.

16. The non-reactive hot melt adhesive according to claim 1, wherein the amount of carbodiimide ranges between 0.5 and 2.5% by weight as determined on the amounts of carbodiimide and the copolymer.

17. The method according to claim 6, wherein the amount of carbodiimide ranges between 0.5 and 2.5% by weight as determined on the amounts of carbodiimide and the copolymer.

* * * * *